United States Patent [19]

Imazeki

[11] 3,801,914

[45] Apr. 2, 1974

[54] PRIORITY-FREQUENCY SYSTEM FOR A SIGNAL-SEEKING RECEIVER

[75] Inventor: Kazuyoshi Imazeki, Tokyo, Japan

[73] Assignee: General Research of Electronics, Inc., Chicago, Ill.

[22] Filed: June 27, 1972

[21] Appl. No.: 266,652

[52] U.S. Cl. .................................. 325/334, 325/470

[51] Int. Cl. .............................................. H04b 1/36

[58] Field of Search ........... 325/334, 335, 468, 469, 325/470; 334/11, 16, 18; 343/205, 206

[56] References Cited

UNITED STATES PATENTS

| | | | |
|---|---|---|---|
| 3,617,895 | 11/1971 | Tomsa et al. | 325/470 X |
| 3,614,621 | 10/1971 | Chapman et al. | 325/469 X |
| 3,665,318 | 5/1972 | Hoffman et al. | 325/470 |

*Primary Examiner*—Benedict V. Safourek
*Attorney, Agent, or Firm*—Fitch, Even, Tabin & Luedka

[57] ABSTRACT

A priority-frequency system is provided for a signal-seeking receiver to automatically tune the receiver to a priority signal whenever it is received. During non-priority receiver operation, a scanning circuit causes the receiver to automatically scan a plurality of predetermined frequencies and tune to a received signal having a frequency corresponding to one of the predetermined frequencies. The priority system includes an astable switching circuit for periodically overriding the scanning circuit to tune the receiver to a priority frequency which is selected from the predetermined frequencies by a manual switch. When a priority signal is received, a control circuit stops the astable switching means so that the receiver is automatically tuned to the priority station whenever a signal of that frequency is received.

4 Claims, 1 Drawing Figure

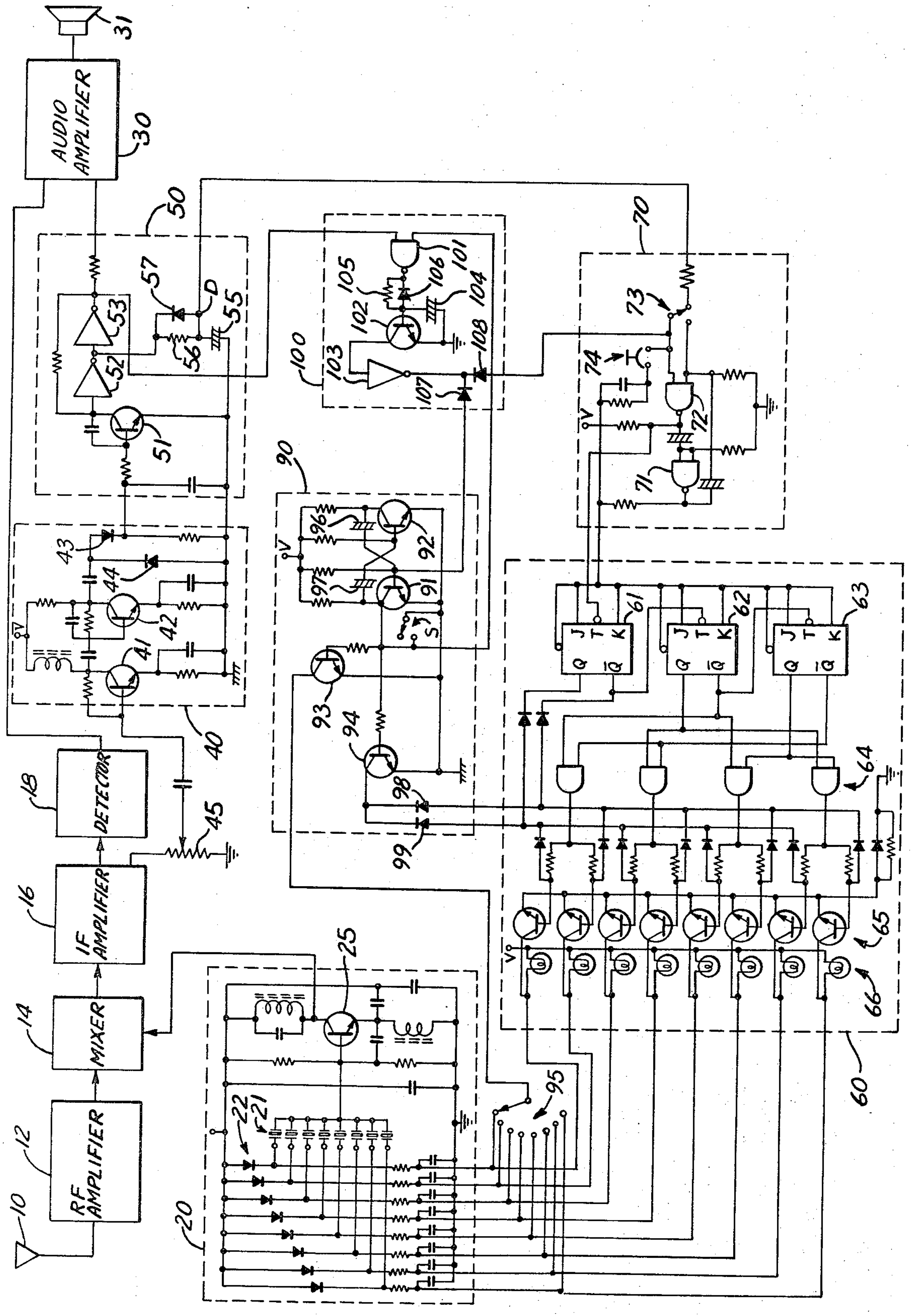
AUDIO AMPLIFIER
DETECTOR
IF AMPLIFIER
MIXER
RF AMPLIFIER

PRIORITY-FREQUENCY SYSTEM FOR A SIGNAL-SEEKING RECEIVER

The present invention generally relates to signal-seeking receivers and, more particularly, relates to such receivers which also automatically tune to a priority frequency when a signal of that frequency is received.

Signal-seeking receivers are well-known for their convenience in automatically tuning to any one of a plurality of frequencies such as those corresponding to television channels, broadcast radio stations, or two-way communication channels. With the advent of solid-state electronic circuitry, conventional signal-seeking receivers have been developed which generally operate more efficiently and accurately than those systems employing an electric motor or series of relays for varying the tuning portion of the receiver.

One particularly attractive application for a signal-seeking receiver is in a two-way communication system having a plurality of frequencies or channels. In such a system, a signal-seeking receiver enables the listener to monitor all of the stations without having to continuously tune the receiver manually to each of the stations. Moreover, the signal-seeking feature is especially convenient for a mobile two-way communication receiver because the listener often has his hands occupied.

One difficulty with such a system, however, is that while the receiver in question is tuned to and receiving a signal transmission on one of the frequencies, a second channel may come on the air. In certain instances, the communication carried by the second channel may be more important to the listener than that of the first. In such a situation, conventional signal-seeking receivers generally remain tuned to the first channel until it goes off the air before tuning to the second channel. Quite obviously, the more channels included in the system, the more likely this undesirable result will occur. In those few types of conventional receivers which do switch to the priority frequency, the priority circuitry employed is relatively complex and not readily adaptable to systems utilizing a number of frequencies (e.g., six or more) and having different operational modes.

It is therefore an object of the invention to provide an improved signal-seeking receiver having a system for designating a particular frequency as a priority frequency and automatically tuning to a signal of that frequency whenever it is received.

It is another object of the invention to provide such a system which is relatively simple and economical to construct and is adaptable to a multi-frequency system in which any one of the frequencies may be selected to be the priority frequency.

Other objects and advantages of the invention are more particularly set forth in the following detailed description and in the accompanying drawing, the single FIGURE of which is an electrical schematic diagram of a specific embodiment of a signal-seeking receiver having a priority-frequency system constructed in accordance with the principles of the present invention.

With reference to the FIGURE, generally, the illustrated embodiment of the receiver comprises an antenna 10 for receiving a plurality of signals each having a frequency corresponding to one of a plurality of predetermined frequencies and for applying equivalent electrical signals to a suitable RF amplifier 12. It should be noted that, although the invention is described in a two-way communications environment, the principles of the invention are also applicable to other electromagnetic-radiation communication systems such as broadcast radio and television systems. The output of RF amplifier 12 is coupled to the input of a superheterodyne mixer 14 which is responsive to the output signal from a variable-frequency local oscillator circuit 20 for developing an intermediate frequency which is applied to an IF amplifier 16. The audio intelligence signal is developed by an audio detector 18 of a type suitable for the particular type of signal the receiver is designed to receive (AM, FM, pulse-code modulation, etc.). The audio output signal from audio detector 18 is coupled to an audio amplifier 30 for ultimate reproduction by a loudspeaker 31. The circuitry thus far described is essentially conventional and forms no important part of the present invention and therefore is discussed herein only briefly.

A signal detecting means 40 is responsive to the reception of a signal having a frequency corresponding to one of the predetermined frequencies to develop a control signal indicative thereof. The control signal is coupled to audio amplifier 30 by means of a threshold switching circuit 50 to disable or mute audio amplifier 30 when the receiver is not receiving a desired signal so that annoying, non-intelligent sounds are not reproduced by loudspeaker 31. This muting operation is often referred to as "squelching" and is an optional feature of the disclosed system.

A variable tuning means in the form of a variable-frequency local oscillator circuit 20 is operable to selectively tune the receiver to the aforementioned predetermined frequencies. Oscillator circuit 20 comprises a plurality of piezoelectric crystal tuning element 21 which are adapted to be selectively and oeratively connected into circuit 20 which further comprises an oscillating transistor 25. A scanning means in the form of a digital-logic sequential switching circuit 60 is coupled to oscillating circuit 20 to operatively connect each of crystal tuning elements 21 selectively into the oscillating circuit. A clock circuit 70 is used to generate a timing signal which drives sequential switching circuit 60 at a predetermined scanning rate. The scanning operation is stopped in response to the control signal developed by signal detector 40. The control signal is coupled to clock circuit 70 by threshold switching circuit 50 to disable the clock and thereby stop sequential switching circuit 60 so that the particular one of crystals 21 which caused oscillator 20 to tune the receiver to the frequency of the received signal remains connected in the oscillating circuit to thus maintain the receiver tuned to the received signal.

In accordance with the illustrated embodiment of the invention, a priority-frequency selector switch 95 is operable to select any particular one of the predetermined frequencies as the priority frequency. An astable switching means 90 is provided for periodically overriding sequential switching circuit 60 and causing variable-frequency oscillator 20 to tune the receiver to the selected priority frequency. As illustrated in the FIGURE, astable switching means 90 periodically connects the crystal corresponding to the selected priority frequency between the base of oscillating transistor 25 and ground and simultaneously disables the scanning means to thereby disconnect the crystal corresponding to the non-priority frequency to which the receiver was then tuned. Astable switching means 90 is controlled by a priority control means 100 which is responsive to the control signal developed by detector 40 which signal is applied to control circuit 100 by threshold switching circuit 50 to stop astable switching means 90 in the priority-frequency switching state, thereby maintaining the receiver tuned to a signal having a frequency corresponding to the priority frequency.

More particularly, variable-frequency oscillator 20 of the embodiment of the invention shown in the FIGURE, includes a conventional oscillating transistor 25 and its associated circuitry together with a plurality of tuning elements which are selectively coupled from the base of oscillating transistor 25 to ground by sequential switching circuit 60. The resonant frequency of the tuning element coupled between the base of oscillating transistor 25 and ground (with respect to AC signals) determines the frequency of oscillation of the circuit. As shown in the illustrated embodiment of the invention, the tuning elements comprise a plurality of piezoelectric crystal tuning elements 21 each having a different resonant frequency which, when respectively heterodyned or "mixed" with each predetermined frequency, produces a frequency corresponding to the intermediate frequency of the receiver. The cathodes of a corresponding plurality of diodes 22 are respectively connected to crystals 21, with the anodes being connected to a suitable voltage source V and the cathodes also respectively coupled to the outputs of sequential switching circuit 60 by means of a corresponding plurality of coupling resistors 23. Accordingly, an individual crystal tuning element is operatively connected between the base of transistor 25 and ground by forward biasing its associated diode. Frequency scanning is thus achieved by sequential switching circuit 60 developing a plurality of output voltages that maintain all but one of diodes 22 reversed biased, with a different diode being forward biased with each clock pulse from clock circuit 70.

Sequential switching circuit 60 of the illustrated embodiment of the invention includes three J-K flip-flops 61, 62 and 63 which operate as a counter circuit and which are responsive to the clock pulses from clock circuit 70 to apply logic signals to a series of four AND gates 64. Each one of AND gates 64 is operable to enable actuation of one pair of the four pairs of switching transistors collectively designated by reference character 65. The Q and $\overline{Q}$ outputs from J-K flip-flop 61 alternately enable actuation of each transistor in each transistor pair. Consequently, each one of switching transistors 65 is temporarily actuated in sequence by the cooperation of AND gates 64 and flip-flop 61, with the amount of time each switching transistor 65 is actuated being determined by the frequency of the timing signal applied by clock circuit 70. Actuating each of transistors 65 forward biases the corresponding diode 22 in oscillator 20 and also turns on the corresponding one of a series of indicator lights 66, the latter providing a visual indication of the frequency to which the receiver is then tuned. It is understood, of course, that the particular number of switching transistors 65, indicating lamps 66, corresponding crystal tuning elements 21, and diodes 22 may be varied without departing from the principles of the invention.

Clock circuit 70 develops a pulse-train signal to drive sequential switching circuit 60 and for this purpose comprises a pair of NAND gates 71 and 72 which are operated as a blocking oscillator. The particular circuit employed for the clock function may, of course, be of any design suitable for developing a pulse-train signal having a repetition rate of approximately 10 Hertz, for example, for application to the trigger or "clock" terminal T or J-K flip-flop circuit 61 of sequential switching circuit 60. A single-pole double-throw switch 73 is provided for switching the system to either an automatic scanning or a manual scanning operation; as shown in the FIGURE, switch 73 is in the automatic scanning position. When switch 73 is in the manual scanning position, the contact closure of a momentary-contact switch 74 is operable to cause clock 70 to develop a single output pulse which in turn causes sequential switching circuit 60 to shift oscillator 20 one tuning element position or frequency. Thus, the system may be manually sequenced through any number of the frequencies of the system or set to a given one of the frequencies for a period of time, as desired.

To detect the reception of a desired signal, signal detecting means 40 comprises a generally conventional circuit often referred to as a "noise-amplifier squelch" circuit. For this purpose, a pair of amplifying transistors 41 and 42 are used to amplify the non-intelligence or "noise" signal present in the system when the receiver is not receiving a signal having a frequency corresponding to that frequency to which the receiver is then tuned. The collector circuit of transistor 41 is tuned to respond to frequencies other than those of interest (e.g., the intermediate frequency or audio frequencies, depending on where the input signal for signal detector 40 is taken). A pair of diodes 43, 44 convert the amplified AC noise signal to a control signal in the form of a DC voltage which may be utilized to indicate whether or not a desired signal is received (e.g., the control signal is a positive five volts--a digital-logic "high"--when no desired signal is received and is zero volts--a digital-logic "low"--when a desired signal is received). The input to detector 40 may be obtained from any convenient circuit location in the receiver, depending on the frequency of interest and the particular circuitry employed. To vary the sensitivity of the detector, the amplitude of the signal applied thereto may be adjusted by utilizing a potentiometer 45, as shown in the FIGURE, or any suitable equivalent thereof.

In the illustrated embodiment of the invention, threshold circuit 50 is used to couple the control signal from signal detector 40 to audio amplifier 30 to mute the audio amplifier when no desired signal is being received. Although it is not necessary for the operation of the invention, threshold switching circuit 50 is provided in this specific embodiment thereof to modify the control signal to make it more suitable for application to audio amplifier 30, as well as to other parts of the circuit, as described in greater detail below. Threshold switching circuit 50 comprises a switching transistor 51 and a pair of inverters 52, 53 to increase the magnitude of the control signal as well as provide output signals of both the same and the opposite polarity as that of the control signal developed by signal detector 40. These output signals are appropriate for use in the specific embodiment of the invention illustrated in the FIGURE, as also described below in greater detail.

In accordance with an optional aspect of the illustrated embodiment of the invention, threshold circuit 50 further comprises storing or delaying means in the form of a storage capacitor 55, a timing resistor 56, and a diode 57 for temporarily maintaining or storing the control signal for a predetermined period of time (e.g., 2 seconds) after the termination of the development thereof by signal detector 40 due to a temporary interruption in signal transmission or during the time the receiver is tuned to the priority frequency and no priority-frequency signal is received. The signal is applied from the junction of capacitor 55 and diode 57 (terminal D) to clock circuit 70 to stop scanning circuit 60 by stopping clock 70. Thus, when the output signal of inverter 52 goes "low" (indicating that a desired signal is being received), the "low" signal is directly and instantaneously applied to clock circuit 70 by diode 57; whereas, when reception of the desired signal terminates, a "high" signal appears at the output of inverter 52 which is blocked by diode 57 and therefore is coupled to clock circuit 70 only after a predetermined amount of time has elapsed, as determined by the time constant of storage capacitor 55 and timing resistor 56. Consequently, upon reception of a desired signal, signal detector 40 develops a control signal indicative thereof which is coupled to clock circuit 70 to cause scanning circuit to maintain oscillator 20, and thus the receiver, tuned to the frequency of the received signal. Should the transmission of the received signal for some reason be briefly interrupted, however, the delaying circuit of threshold switching circuit 50 will maintain the receiver tuned to the same frequency until transmission is continued, thereby preventing the receiver from being tuned to another frequency during the brief interruption.

In accordance with the illustrated embodiment of the invention, the control signal developed by signal detector 40 is also used to control astable or priority-frequency switching circuit 90. The control signal is obtained at the output of inverter 53 of threshold switching circuit 50 where it has a suitable magnitude and polarity for application to one of the two inputs of NAND gate 101 of priority control circuit 100. The signal for the other input of NAND gate 101 is obtained from priority-frequency switching circuit 90. When circuit 90 is in the priority-frequency switching state, as explained in greater detail below, it applies a logical "high" to NAND gate 101. Consequently, when a priority-frequency signal is received, both inputs to NAND gate 101 are "high" which results in a "low" output signal. This "low" logic signal is coupled from NAND gate 101 to priority-frequency switching circuit 90 by means of a switching transistor 102, inverter 103, and a delaying circuit comprising a storage capacitor 104, a timing resistor 105, and a diode 107 to maintain priority-frequency switching circuit 90 in the priority-frequency switching state. Alternatively, when circuit 90 is in the priority-frequency switching state but no signal having the priority frequency is received, only one input to NAND gate 101 is "high"; hence, a "low" logic signal is not applied to priority-frequency switching circuit 90 (a "high" is developed but it is blocked by diode 107) and the periodic switching thereof continues until a priority-frequency signal is received.

As mentioned above, priority-frequency switching circuit 90 of the illustrated embodiment of the invention comprises an astable switching means which causes oscillator 20 to periodically tune the receiver to the priority frequency selected by selector switch 95. For this purpose, circuit 90 employs an astable multivibrator switching circuit comprising a pair of multivibrator transistors 91, 92 and the associated biasing and timing circuitry. When multivibrator transistor 91 is in the non-conductive or "off" state (multivibrator transistor 92 is therefore in the conductive or "on" state), switching transistors 93 and 94 are turned on to operatively connect the crystal tuning element associated with the priority frequency (as selected by priority-frequency selector switch 95) into oscillating circuit 20 and to effectively disconnect all of the remaining non-priority-frequency crystals, respectively. The non-priority-frequency crystals are effectively disconnected fron oscillator 20 by grounding the base input circuits of switching transistors 65 through a pair of diodes 98, 99 and switching transistor 94. When multivibrator transistor 91 is turned on (multivibrator transistor 92 is therefore turned off), switching transistors 93 and 94 are turned off to effectively disconnect the priority-frequency crystal from oscillating transistor 25 and operatively connect the particular non-priority crystal selected by sequential switching circuit 60. An on/off switch S is provided as shown to ground the collector of multivibrator transistor 91 and thus disable circuit 90 when the priority-frequency feature is not desired.

In accordance with another optional aspect of the illustrated embodiment of the invention, the value of timing capacitor 97 is made larger than that of timing capacitor 96 so that the multivibrator switching time is asymmetrical; that is, multivibrator transistor 91 remains in the conductive state or turned "on" for a longer period of time than does multivibrator transistor 92. This, together with the delaying circuit of threshold switching circuit 50, provides for frequent sampling of checking of the priority frequency without interrupting reception of a non-priority-frequency signal. The timing of priority switching circuit 90 relative to sequential switching circuit 60 is of course a matter of design choice depending upon the particular application of the system.

In operation, priority-frequency switching circuit 90 alternately switches between a priority-frequency state (i.e., the switching state in which multivibrator transistor 91 is turned off) and a non-priority-frequency state (i.e., the switching state in which multivibrator transistor 91 is turned on). When circuit 90 switches to the priority-frequency state and no signal having the priority frequency is received, no control signal is developed by signal detector 40 and therefore priority control circuit 100 does not stop the switching of circuit 90. The switching time of circuit 90 is made short enough (e.g., less than 2 seconds) so that if just prior to the system switching to the priority-frequency state the receiver had been tuned to and receiving a signal having a non-priority frequency, the receiver returns to that signal because of the delaying circuit of threshold circuit 50 discussed above. On the other hand, when circuit 90 switches to the priority state and a signal having the priority frequency is received, priority control circuit 100 stops the switching of circuit 90 to maintain the receiver tuned to the priority signal. The delaying circuit of priority control circuit 100, similar to that of threshold switching circuit 50, temporarily maintains priority switching circuit 90 in the priority-frequency state for a predetermined period of time (e.g., 2 seconds) after the termination of the reception of a priority signal. This provides continuity of reception during brief interruptions of the priority-frequency signal.

In accordance with another optional aspect of the illustrated embodiment of the invention, memory means are provided to retune the receiver to the last previously tuned non-priority frequency after each time the receiver has been tuned to the priority frequency and even though the receiver has been tuned to and receiving a priority-frequency signal and reception thereof ceases. This is accomplished in this specific embodiment by employing a pair of diodes 107, 108 in priority control circuit 100 for applying the logic signal which stops clock circuit 70 whenever priority-frequency switching circuit 90 is in the priority-frequency state. In this state, diode 107 prevents a "high" logic signal from being coupled to the base of multivibrator transistor 91 and diode 108 applies a "low" logic signal to one input of NAND gate 72 to prevent clock circuit 70 from developing any clock pulses, thereby preventing sequential switching circuit 60 from changing the frequency of oscillator circuit 20. Diode 108 also isolates the input of NAND gate 72 from "high" logic signals produced by inverter 103.

Thus there has been shown and described an improved signal-seeking receiver having a system for designating a particular frequency as a priority frequency and automatically tuning to a signal of that frequency whenever it is received. The system is relatively simple and economical to construct and is adaptable to a multi-frequency system in which any one of the frequencies may be selected to be the priority frequency. The system may be provided with a very simple memory to automatically retune the receiver to the non-priority frequency to which it was tuned just prior to tuning to the priority frequency.

It will, of course, be understood that modifications of the present invention, in its various aspects, will be apparent to those skilled in the art, some being apparent only after study, and other being merely matters of routine design. As such, the scope of the invention should not be limited by the particular embodiment and specific construction herein described, but should be defined only by the appended claims, and equivalents thereof.

Various features of the invention are set forth in the following claims.

What is claimed is:

1. In a signal-seeking receiver which automatically scans a plurality of predetermined radio frequencies and tunes to a received signal having a frequency corresponding to one of said predetermined frequencies, a system for selectively designating any particular one of said predetermined frequencies as a priority frequency and tuning said receiver to said priority frequency whenever a signal having the designated priority frequency is received, comprising:

- variable tuning means adapted to selectively tune said receiver to said predetermined frequencies;
- scanning means for causing said variable tuning means to sequentially tune said receiver to each of said predetermined frequencies;
- signal detecting means responsive to the reception of a signal having a frequency corresponding to one of said predetermined frequencies for developing a control signal;
- means responsive to said control signal for stopping said scanning means to thereby maintain the receiver tuned to the received signal;
- means for selecting any particular one of said predetermined frequencies as the priority frequency;
- means for periodically causing said variable tuning means to tune said receiver to said selected priority frequency;
- priority control means responsive to said control signal for stopping said periodic means to thereby cause said tuning means to maintain the receiver tuned to a received signal having a frequency corresponding to the priority frequency;
- and means for periodically causing said variable tuning means to tune said receiver to said selected priority frequency, including astable switching means having an asymmetrical switching time and which is switched to the priority-frequency tuning state for a shorter period of time than it is tuned to the non-priority switching state.

2. In a signal-seeking receiver which automatically scans a plurality of predetermined radio frequencies and tunes to a received signal having a frequency corresponding to one of said predetermined frequencies, a system for selectively designating any particular one of said predetermined frequencies as a priority frequency and tuning said receiver to said priority frequency whenever a signal having the designated priority frequency is received, comprising:

- variable tuning means adapted to selectively tune said receiver to said predetermined frequencies;
- scanning means for causing said variable tuning means to sequentially tune said receiver to each of said predetermined frequencies;
- signal detecting means responsive to the reception of a signal having a frequency corresponding to one of said predetermined frequencies for developing a control signal;
- means responsive to said control signal for stopping said scanning means to thereby maintain the receiver tuned to the received signal;
- means for selecting any particular one of said predetermined frequencies as the priority frequency;
- means for periodically causing said variable tuning means to tune said receiver to said selected priority frequency;
- priority control means responsive to said control signal for stopping said periodic means to thereby cause said tuning means to maintain the receiver tuned to a received signal having a frequency corresponding to the priority frequency;
- and storing means coupled between said signal detecting means and said scanning means for temporarily maintaining said control signal for a predetermined period of time after the termination of the development thereof by said signal detecting means, thereby providing continuous tuning of the receiver to one of the predetermined frequencies during brief interruptions in signal transmission and during the time the receiver is tuned to the priority frequency when no priority-frequency signal is received.

3. In a signal-seeking receiver which automatically scans a plurality of predetermined radio frequencies and tunes to a received signal having a frequency corresponding to one of said predetermined frequencies, a system for selecting any particular one of said predetermined frequencies as a priority frequency and tuning said receiver to said priority frequency whenever a signal having the selected priority frequency is received, comprising:

variable tuning means having a local oscillator circuit operable to selectively oscillate at each of a corresponding plurality of local oscillator frequencies, said local oscillator including a corresponding plurality of tuning elements adapted to be operatively connected into said local oscillator individually;

clock means for generating a timing signal;

digital logic sequential switching means responsive to said timing signal for operatively connecting each of said tuning elements into said local oscillator circuit individually to thereby cause said local oscillator circuit to selectively oscillate at each of said local oscillator frequencies;

signal detecting means responsive to the reception of a signal having a frequency corresponding to one of said predetermined frequencies for developing a control signal;

a threshold switching circuit responsive to said control signal for stopping the generation of said timing signal by said clock means;

a selector switch coupled to said local oscillator circuit and having a corresponding plurality of switch positions for selecting any particular one of said predetermined frequencies as the priority frequency;

a priority control circuit responsive to said control signal for developing a priority control signal;

an astable switching circuit coupled between said priority control circuit and said selector switch for periodically switching said local oscillator circuit between the state in which the local-oscillator frequency corresponds to the non-priority frequency to which the receiver is then tuned and the state in which the local-oscillator frequency corresponds to said selected priority frequency, said astable switching circuit being responsive to said priority control signal for remaining in the priority-frequency switching state;

and said astable switching circuit including an astable multivibrator having an asymmetrical switching time, a first switching transistor responsive to said multivibrator switching to said priority-frequency switching state for operatively connecting into said local oscillator the tuning element corresponding to the local-oscillator frequency corresponding to said selected priority frequency, and a second switching transistor responsive to said multivibrator being switched to said priority-frequency switching state for operatively disconnecting from said local oscillator circuit the tuning elements corresponding to the local-oscillator frequencies corresponding to the non-priority frequencies.

4. In a signal-seeking receiver which automatically scans a plurality of predetermined radio frequencies and tunes to a received signal having a frequency corresponding to one of said predetermined frequencies, a system for selecting any particular one of said predetermined frequencies as a priority frequency and tuning said receiver to said priority frequency whenever a signal having the selected priority frequency is received, comprising:

variable tuning means having a local oscillator circuit operable to selectively oscillate at each of a corresponding plurality of local oscillator frequencies, said local oscillator including a corresponding plurality of tuning elements adapted to be operatively connected into said local oscillator individually;

clock means for generating a timing signal;

digital logic sequential switching means responsive to said timing signal for operatively connecting each of said tuning elements into said local oscillator circuit individually to thereby cause said local oscillator circuit to selectively oscillate at each of said local oscillator frequencies;

signal detecting means responsive to the reception of a signal having a frequency corresponding to one of said predetermined frequencies for developing a control signal;

a threshold switching circuit responsive to said control signal for stopping the generation of said timing signal by said clock means;

a selector switch coupled to said local oscillator circuit and having a corresponding plurality of switch positions for selecting any particular one of said predetermined frequencies as the priority frequency;

a priority control circuit responsive to said control signal for developing a priority control signal;

an astable switching circuit coupled between said priority control circuit and said selector switch for periodically switching said local oscillator circuit between the state in which the local-oscillator frequency corresponds to the non-priority frequency to which the receiver is then tuned and the state in which the local-oscillator frequency corresponds to said selected priority frequency, said astable switching circuit being responsive to said priority control signal for remaining in the priority-frequency switching state;

and said priority control circuit including a storing circuit for temporarily maintaining said priority control signal for a predetermined period of time after the termination of the development of the signal-detector control signal, thereby providing continuous tuning of the receiver to one of the predetermined frequencies during brief interruptions in priority-frequency signal transmission.

* * * * *